(12) United States Patent
Okazaki

(10) Patent No.: US 7,671,881 B2
(45) Date of Patent: Mar. 2, 2010

(54) TIMING DETECTION CIRCUIT AND APPARATUS FOR MODULATING LIGHT BEAM

(75) Inventor: Ryoji Okazaki, Mihama-ku (JP)

(73) Assignee: Kawasaki Microelectronics, Inc., Chiba (JP)

(*) Notice: Subject to any disclaimer, the term of this patent is extended or adjusted under 35 U.S.C. 154(b) by 0 days.

(21) Appl. No.: 11/892,490

(22) Filed: Aug. 23, 2007

(65) Prior Publication Data

US 2008/0055697 A1     Mar. 6, 2008

(30) Foreign Application Priority Data

Aug. 31, 2006   (JP) .............. 2006-235074

(51) Int. Cl.
 *B41J 2/47* (2006.01)
 *B41J 2/435* (2006.01)

(52) U.S. Cl. ...................... 347/235; 347/250

(58) Field of Classification Search ............ 347/235, 347/250

See application file for complete search history.

(56) References Cited

U.S. PATENT DOCUMENTS

| 6,807,244 | B2 | 10/2004 | Kawasaki et al. |
| 7,212,224 | B2 | 5/2007 | Nihei et al. |
| 7,327,379 | B2 | 2/2008 | Nihei et al. |
| 2005/0099489 | A1* | 5/2005 | Nihei et al. .............. 347/248 |
| 2005/0146596 | A1* | 7/2005 | Nihei et al. .............. 347/239 |
| 2008/0143814 | A1 | 6/2008 | Masui et al. |

FOREIGN PATENT DOCUMENTS

| JP | A-4-249971 | 9/1992 |
| JP | A-11-216906 | 8/1999 |
| JP | A-11-245447 | 9/1999 |
| JP | A-2005-88490 | 4/2005 |
| JP | A-2007-130793 | 5/2007 |

* cited by examiner

*Primary Examiner*—Matthew Luu
*Assistant Examiner*—Kendrick X Liu
(74) *Attorney, Agent, or Firm*—Oliff & Berridge, PLC

(57) ABSTRACT

A timing detection circuit including a first timing detection circuit, a second detection circuit, and an output circuit is disclosed. The first detection circuit detects, among multiphase clocks having n mutually different phases and a frequency of k times the frequency of a reference clock, a closest clock having a clock edge closest to a valid edge of the synchronizing signal and generates first detect signal DET_A indicating the detected clock. The second timing detection circuit detects within which of k successive cycles of the representative clock selected from the multiphase clocks the valid edge of the synchronizing signal is positioned and generates second detect signal DET_B indicating the detected cycle. The output circuit receives the first detect signal and the second detect signal and outputs first output signal OUT_A and second output signal OUT_B.

12 Claims, 6 Drawing Sheets

TIMING DETECTION CIRCUIT AND APPARATUS FOR MODULATING LIGHT BEAM

CROSS-REFERENCE TO RELATED APPLICATION

Exemplary embodiments of this invention were first described in Japanese Patent Application No. 2006-235074, which is hereby incorporated by reference in its entirety.

BACKGROUND

Exemplary embodiments of this invention relate to timing detection circuits for detecting timing of a synchronization signal, which may be used in synchronizing processing in, for example, laser-beam printers, digital copiers, facsimile apparatus, or the like. Exemplary embodiments of this invention also relate to apparatus for modulating light beam by utilizing results of timing detection of a synchronizing signal.

In, for example, laser-beam printers, digital copiers, facsimile apparatus, or the like, scanning light beam, which is modulated in accordance with image data, on a photosensitive body produces images. In such apparatus, in order to control the position of the image along a direction of scanning of the light beam, detecting the light beam by means of a light sensor placed at a fixed position generates a synchronizing signal. And the timing of modulating the light beam is set using the synchronizing signal.

Accordingly, for applications of image generation described above, a synchronizing circuit is generally provided. The synchronizing circuit detects the timing of the synchronizing signal and synchronizes the modulation of the light beam with the timing of the synchronizing signal. In the timing detection of the synchronizing signal, in principle, a video clock and the synchronizing signal is compared and the timing of the synchronizing signal with respect to the video clock is detected. Then, in accordance with the result of timing detection, one of following procedures (synchronizing procedures) is performed.

a. An adjusted video clock having a timing adjusted in accordance with the result of timing detection is generated (or, a plurality of video clocks is generated and one of the clocks having a suitable timing is selected from among them), and the light beam is modulated with reference to the adjusted (or selected) video clock; or b. The same video clock (or a reference clock) is used regardless of the result of timing detection, but the timing of modulating the light beam with respect to the reference clock is adjusted in accordance with the result of timing detection.

However, it is only possible to detect the timing of the synchronizing signal with an accuracy of a cycle of the video clock by comparing the video clock and a synchronizing signal as they are. Accordingly, as described in Patent Document 1 (Japanese Laid-open Patent Hei 04-249971), for example, following improved techniques, which aim to improve the accuracy of timing detection of a synchronizing signal, are proposed in order to improve the image quality.

1. A high-frequency clock having a frequency of n-times (n is an integer equal to or larger than 2) the video clock is generated, and the high-frequency clock is compared with a synchronizing signal 2. Multiphase clocks having the same frequency as the video clock and m (m is an integer equal to or larger than 2) mutually different phases are generated, and each of the multiphase clocks are compared with a synchronizing signal.

Further, for example, Patent Document 2 (Japanese Laid-open Patent Hei 11-245447) proposes a following procedure. That is, as a first-stage timing detection, a high-frequency clock is compared with a synchronizing signal and a video clock is generated in accordance with a result of the first-stage timing detection. Moreover, as a second-stage timing detection, generated video clock is compared with the synchronizing signal and also with a plurality of delayed synchronizing signals, which are successively delayed by a fixed period. And a further timing adjustment of the clock signal by generating a plurality of video clocks and selecting one of them having a proper timing is performed in accordance with a result of the second-stage timing detection.

The first technique described above may achieve n-time improvement of the accuracy of timing detection of the synchronizing signal by an n-time increase of the frequency of the high-frequency clock. However, increasing the frequency of the high-frequency clock increases the power consumption and instability of the semiconductor integrated circuit that constitutes the synchronizing circuit. Accordingly, improvement of the accuracy by using this technique has a limitation.

The second technique described above may improve the accuracy of timing detection of the synchronizing signal by generating a large number of multiphase clocks with small phase differences between them and by comparing them with the synchronizing signal. However, the size of the circuitry increases because it is necessary to compare each of the multiphase clocks with the synchronizing signal. The increase of the size of circuitry also results in the increase of power consumption.

In Patent Document 2, as a first-stage timing adjustment, a first-stage timing detection by comparing a high-frequency clock with a synchronizing signal is performed and a video clock is generated. Then, a further timing adjustment in accordance with a second-stage timing detection by comparing the generated video clock with the synchronizing signal and the successively delayed synchronizing signals is performed. Accordingly, it might be possible to improve the accuracy of timing detection without excessively increasing the frequency of the clock or the size of the circuitry. However, there is a difficulty in performing the synchronization by combining the results of the first- and the second-stage timing detections.

Particularly, in Patent Document 2, according to the procedure "a" described above, a video clock to which a timing adjustment is performed is generated in accordance with results of timing detections. However, no technique is disclosed to enable the procedure "b" described above to adjust a timing of modulation with respect to a reference clock in accordance with results of timing detections.

SUMMARY

Various exemplary embodiments aim to solve the problems described above. The exemplary embodiments provide timing detection circuits for detecting timing of a synchronizing signal with high accuracy without excessively increasing the clock frequency or the size of circuitry such that the timing of modulation with respect to a reference clock can be adjusted in accordance with the result of timing detection. The exemplary embodiments also provide apparatus for modulating light beams that can adjust the timing of modulation with respect to a reference clock in accordance with the result of timing detection.

In order to address or solve the above-described problems, various exemplary embodiments disclosed herein provide a timing detection circuit for detecting a timing of a valid edge of a synchronizing signal with respect to a reference clock having a reference frequency. The timing detection circuit includes a multiphase clock generation circuit, a first detection circuit, and a second detection circuit. The multiphase clock generation circuit generates n (n is an integer equal to or larger than two) multiphase clocks having respective clock edges and further having a frequency of k (k is an integer equal to or larger than two) times the reference frequency and mutually different phases. The first detection circuit detects, among the multiphase clocks, a closest clock having the clock edge closest to the valid edge of the synchronizing signal and generates a first detect signal indicating the closest clock. And the second detection circuit detects, among k successive cycles of a representative clock selected from the multiphase clocks, a valid cycle within which the valid edge of the synchronizing signal is located and generates a second detect signal indicating the valid cycle.

According to various exemplary embodiments, the second timing detection circuit includes a counter that counts cycles of the representative clock to generate count values and a selecting circuit that selects one of the count values during a select period having a first timing relationship with the valid cycle to generate the second detect signal. The counter may preferably count the cycles of the representative clock using the reference clock as a reset signal.

According to other various exemplary embodiments, the first detection circuit includes n unit detection circuits (n is an even number equal to or larger than two) each including a latch, n/2 comparing circuits each including two of the unit detection circuits, and a decoder. Each of the unit detection circuits samples the synchronizing signal at the clock edges of corresponding one of the multiphase clocks supplied thereto and detects the valid edge of the synchronizing signal. One of the unit detection circuits in each of the comparing circuits that detected the valid edge earlier than the other holds a level of the synchronizing signal after the valid edge in the latch and initializes the latch in the other one of the unit detection circuits. And each of the comparing circuits outputs a comparison result indicating which of the latches held the level of the synchronizing signal after the valid edge. The decoder receives the comparison results from the comparing circuits and determines which of the unit detection circuits detected the valid edge at an earliest timing so that one of the multiphase clocks supplied to the unit detection circuit that detected the valid edge at the earliest timing is detected as the closest clock. Corresponding ones of the multiphase clocks supplied to two unit detection circuits in each of the comparing circuits may preferably be mutually inverted.

According to still other various exemplary embodiments, the first detection circuit includes n flip-flops (n is an integer equal to or larger than two) each samples the synchronizing signal at the clock edges of corresponding one of the multiphase clocks supplied thereto and detects the valid edge of the synchronizing signal; and the second timing detection circuit includes a counter that counts cycles of the representative clock to generate count values and a selecting circuit. The selecting circuit detects the valid edge of the synchronizing signal using one of the flip-flops in the first detection circuit and selects one of the count values during a first period having a timing relationship with the clock edge, by which the valid edge is detected, of one of the multiphase clocks supplied to the one of the flip-flops to generate the second detect signal.

In order to address or solve the above-described problems, various exemplary embodiments disclosed herein provide an apparatus for modulating a light beam in accordance with an image data. The apparatus includes a timing detection circuit that detects a timing of a valid edge of a synchronizing signal with respect to a reference clock having a reference frequency and a modulation circuit that modulates the light beam. The timing detection circuit includes a multiphase clock generation circuit, a first detection circuit, a second detection circuit, and an output circuit. The multiphase clock generation circuit generates n (n is an integer equal to or larger than two) multiphase clocks having respective clock edges and further having a frequency of k (k is an integer equal to or larger than two) times the reference frequency and mutually different phases. The first detection circuit detects, among the multiphase clocks, a closest clock having the clock edge closest to the valid edge of the synchronizing signal and generates a first detect signal indicating the closest clock. The second detection circuit detects, among k successive cycles of a representative clock selected from the multiphase clocks, a valid cycle within which the valid edge of the synchronizing signal is located and generates a second detect signal indicating the valid cycle. The output circuit receives the first detect signal and the second detect signal and outputs a first output signal indicating the closest clock and a second output signal indicating the valid cycle. The modulation circuit receives the first output signal and the second output signal and adjusts a timing of the modulation with respect to the reference clock in accordance with the received output signals.

BRIEF DESCRIPTION OF THE DRAWINGS

Various exemplary details of output buffer circuits and systems are described with reference to the following figures, wherein.

DETAILED DESCRIPTION OF EMBODIMENTS

Figure 1:
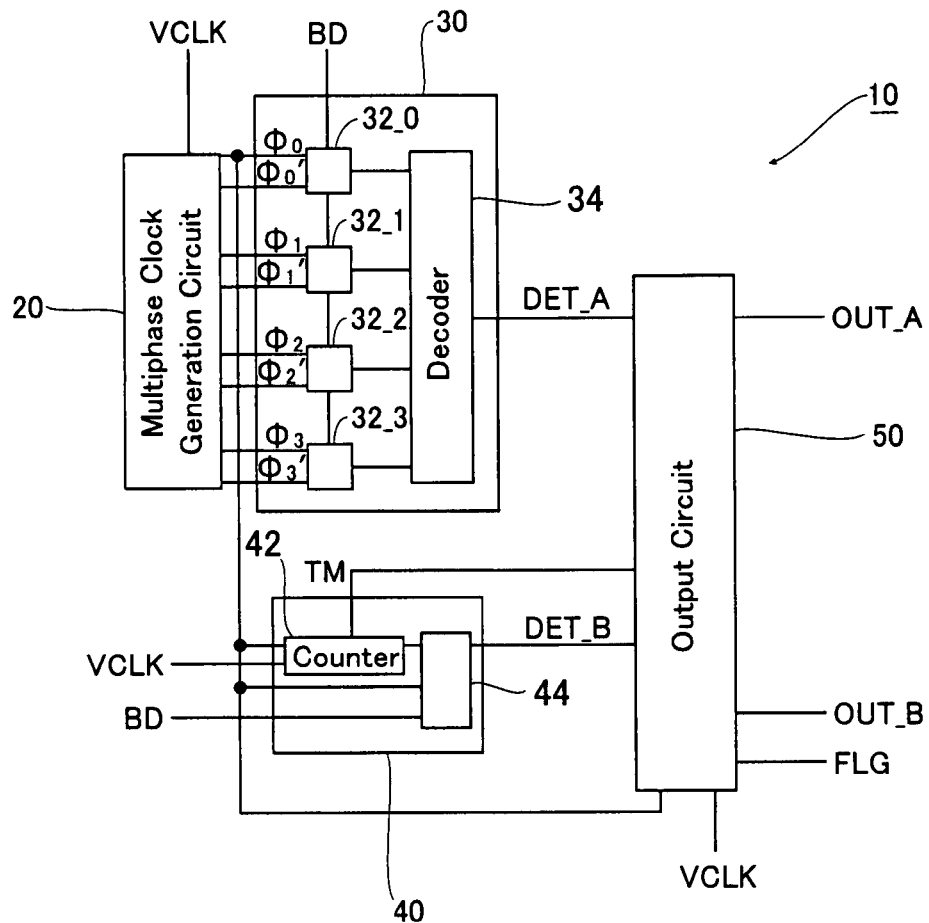
FIG. 1 is a construction drawing showing an outline of an embodiment of timing detection circuit according to this invention.

FIG. 1 is a construction drawing showing an outline of an exemplary embodiment of a timing detection circuit 10 according to this invention.

The exemplary embodiment of timing detection circuit 10 shown in FIG. 1 includes multiphase clock generation circuit 20, first timing detection circuit 30, second timing detection circuit 40, and output circuit 50.

The multiphase clock generation circuit 20 generates n-phase multiphase clocks having a frequency of k times the frequency of a video clock VCLK, which is a reference clock. Here, each of n and k is an integer equal to or larger than two. Specifically, n and k may be, for example, eight and four, respectively. Preferably, the multiphase clock generation circuit 20 generates n/2 pairs of multiphase clocks, each including $\phi i$ (i=0 to (n-2)/2) and $\phi i'$, which has a phase opposite to the phase of $\phi i$. In other words, $\phi i'$ has a phase difference of $\pi$ from the phase of $\phi i$. More specifically, the multiphase clock generation circuit 20 shown in FIG. 1 generates 8-phase clocks, or 4 pairs of clocks including $\phi_0, \phi_0', \phi_1, \phi_1', \phi_2, \phi_2', \phi_3$, and $\phi_3'$.

The first timing detection circuit 30 is supplied with a synchronizing signal BD and above described n multiphase clocks. It detects one of the multiphase clocks having an edge (clock edge) closest to a valid edge of the synchronizing signal BD, and generates first detect signal DET_A. Specifically, it may detect one of the clocks having a clock edge at the earliest timing after the valid edge of the synchronizing signal BD.

The first timing detection circuit 30 may be constructed with, for example, n/2 comparing circuits (four comparing circuits 32_0, 32_1, 32_2, and 32_3, in the example shown in FIG. 1) and a decoder 34. Each of the comparing circuits is supplied with one of the pairs of the multiphase clocks $\phi i$ and $\phi i'$, which are inverted with each other. It detects which of the pair of clocks $\phi i$ and $\phi i'$ has a clock edge (for example, a rising edge) earlier than the other after the valid edge (for example, a falling edge) of the synchronizing signal. The decoder 34 determines, based on the results of comparisons by respective comparing circuits, which of the n multiphase clocks has a clock edge at the earliest timing after the valid edge of the synchronizing signal BD, and outputs the first detect signal DET_A.

However, the first timing detection circuit 30 alone cannot determine the timing of the synchronizing signal BD. Because the multiphase clocks have k times the frequency of the video clock VCLK, each of the n-phase clocks has k clock edges during one cycle of the video clock VCLK. The first detection circuit detects which of the n-phase clocks has a clock edge at the earliest timing after the valid edge of the synchronizing signal BD, but it cannot determine which of k clock edges the detected clock edge is.

Accordingly, the exemplary timing detection circuit 10 shown in FIG. 1 includes, in addition to the first timing detection circuit 30, second timing detection circuit 40. The second timing detection circuit 40 is supplied with the synchronizing signal BD and is also supplied with one of the multiphase clocks, as a representative clock. It detects within which of four successive cycles of the representative clock the valid edge of the synchronizing signal BD is positioned, and generates a second detect signal DET_B.

Specifically, the second timing detection circuit 40 may include a counter 42 that counts the representative clock (or, more exactly, counts cycles of the representative clock) to generate count values. The second timing detection circuit 40 may further include a selecting circuit 44 that selects one of the count values generated by the counter in accordance with the timing of the valid edge of the synchronizing signal BD.

More specifically, in the exemplary second timing detection circuit 40 shown in FIG. 1, $\phi_0$ is supplied as the representative clock among the multiphase clocks $\phi_0, \phi_0', \ldots, \phi_3'$. And, the counter 42 counts $\phi_0$ and generates count values that may change as 0, 1, 2, 3, 0, ... in each of the cycles of $\phi_0$. Besides, the selecting circuit 44 is supplied with the synchronizing signal BD and the representative clock $\phi_0$. It selects the count value during a period having a specific relationship with the valid edge of the synchronizing signal BD, and outputs the selected count value as the second detect signal DET_B.

Combining the first detection result DET_A and the second detection result DET_B enables specification of the timing of the valid edge of the synchronizing signal BD with an accuracy of 1/(k×n) of the cycle period of the reference clock VCLK. However, the timing when the first detect signal DET_A is generated and the timing when the second detect signal DET_B is generated are not necessarily the same. As a result, if these detection results are outputted directly to another circuit, such as a modulation circuit, there might be cases where it is difficult to utilize these results. Accordingly, the timing detection circuit 10 shown in FIG. 1 further includes an output circuit 50 that captures each of the detect signals DET_A and DET_B, synchronizes them, and outputs them as output signals OUT_A and OUT_B.

Moreover, the output circuit 50 shown in FIG. 1 outputs, in addition to the first output signal OUT_A and the second output signal OUT_B, flag signal FLG. The flag signal FLG is a signal that indicates the timing when the first output signal OUT_A and the second output signal OUT_B become valid. It is not indispensable for the timing detection circuit 10 according to this exemplary embodiment that the output circuit 50 outputs flag signal FLG. However, outputting flag signal FLG makes it easy for another circuit to receive and utilizes the first output signal OUT_A and the second output signal OUT_B.

As explained above, the timing detection circuit 10 according to this exemplary embodiment includes a first timing detection circuit that generates a first detect signal DET_A by detecting one of n multiphase clocks having a clock edge closest to the valid edge of the synchronizing signal BD, and a second detection circuit that generates a second detect signal DET_B by detecting within which of k successive cycles of a representative clock the valid edge of the synchronizing signal BD is positioned. The timing detection circuit 10 further includes an output circuit that receives the first detect signal and the second detect signal and outputs them as a first output signal OUT_A and a second output signal OUT_B. Accordingly, another circuit that receives the first output signal OUT_A and the second output signal OUT_B may accurately adjust the timing of modulation.

Next, each of the portions of the timing detection circuit 10 according to the exemplary embodiment will be further explained in detail.

Figure 2:
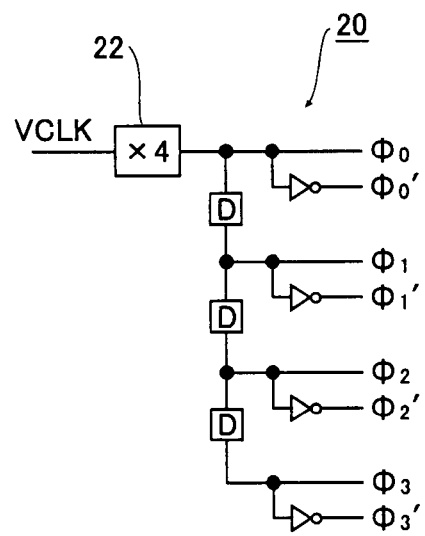
FIG. 2 is a construction drawing showing an embodiment of multiphase clock generation circuit.

FIG. 2 is a construction drawing showing an example of multiphase clock generation circuit 20.

The exemplary multiphase clock generation circuit 20 shown in FIG. 2 includes, for example, a multiplying circuit 22 that generates a high-frequency clock by multiplying an inputted reference clock VCLK by k times (or 4 times, in the example shown in FIG. 2), n/2−1 (or 3, in the example shown in FIG. 2) delay circuits D, and n/2 inverters.

The multiplying circuit 22 may be constructed with, for example, a PLL (Phage Locked Loop) circuit. The delay circuit D has, for example, a delay time corresponding to 1/k (or ⅛, in the example shown in FIG. 2) of the cycle period of the high-frequency clock. Although, in practice, there is a limitation in the accuracy of the delay time, it is preferable to approximately adjust it to 1/k of the cycle period in order to realize a high accuracy timing detection. Each of the n/2−1 delay circuits D, which are connected in series, outputs a high-frequency clock having a phase that is delayed by $2\pi/n$ times the number of serial connection. By outputting the output of each of the delay circuit D directly or through an inverter, n/2 pairs of multiphase clocks (or 4 pairs of multiphase $\phi_0, \phi_0', \phi_1, \phi_1', \phi_2, \phi_2', \phi_3$, and $\phi_3'$, in the case shown in FIG. 2) are generated.

Figure 3:
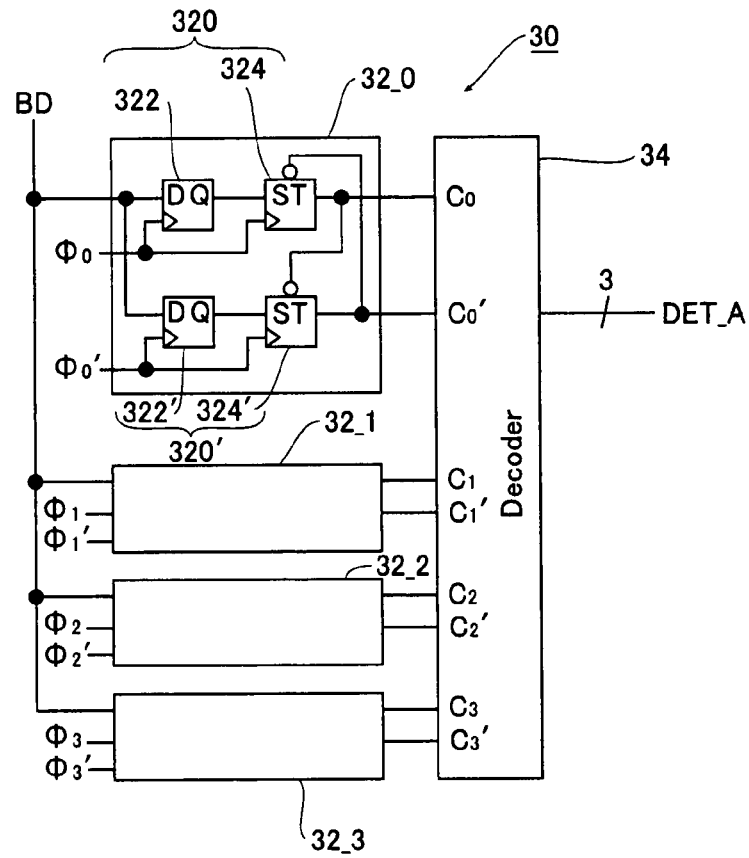
FIG. 3 is a circuit diagram showing an example of first timing detection circuit.

FIG. 3 is a circuit diagram showing an example of the first timing detection circuit. The circuit shown in FIG. 3 detects timing of the synchronizing signal BD having a falling edge as the valid edge using multiphase clocks each having rising edges as clock edges.

The first timing detection circuit 30 shown in FIG. 3 has n/2 (or specifically, 4) comparing circuits 32_0 to 32_3. Each of these comparing circuits has the same construction. In FIG. 3, the detail is shown only for the first comparing circuit 32_0.

As shown in FIG. 3, each of the comparing circuits 32_0 to 32_3 is supplied with the synchronizing signal BD and is also supplied with one of the pairs of the clocks φi and φi' (i=0 to n/2−1, or specifically, 0 to 3), which are inverted with each other. The comparing circuit includes a first unit detection circuit 320 comprised of two flip-flops 322 and 324 that are connected in series, and a second unit detection circuit 320' comprised of two flip-flops 322' and 324' that are also connected in series.

Note that, in FIG. 3, marks "D" representing a D input terminal and "Q" representing a Q output terminal are shown only for the first-stage flip-flops, and the marks are omitted for the second-stage flip-flops. Similarly, the marks are shown only for some of the flip-flops in FIGS. 4 and 5 below. For the flip-flop that is not marked, the terminal on the same side of the clock terminal, which is marked by ">", is the D input terminal, and the one on the opposite side is the Q output terminal.

More specifically, the D input terminal of the first-stage flip-flop 322 in the first unit detection circuit 320 is supplied with the synchronizing signal BD, and the clock terminal thereof is supplied with φi. The D input terminal of the second-stage flip-flop 324 in the same unit detection circuit 320 is supplied with Q output of the first-stage flip-flop 322, and the clock terminal thereof is supplied with φi. On the other hand, the D input terminal of the first-stage flip-flop 322' in the second unit detection circuit 320' is supplied with the synchronizing signal BD, and the clock terminal thereof is supplied with φi'. The D input terminal of the second-stage flip-flop 324' in the same unit detection circuit 320' is supplied with Q output of the first stage flip flop 322', and the clock terminal thereof is supplied with φi'. Moreover, each of Q outputs of the second-stage flip-flops 324 and 324' in the first unit detection circuit 320 and the second unit detection circuit 320' is supplied to the decoder 34 and is also supplied to the set terminal (negative logic) of the other one of the flip-flops 324 and 324'.

In the first unit detection circuit 320 and the second unit detection circuit 320' in the comparing circuit shown in FIG. 3, each of the first-stage flip-flops 322 and 322' samples the synchronizing signal BD at clock edges of the clock supplied thereto. When the valid edge of the synchronizing signal BD is located between the previous clock edge and the current clock edge, sampled levels of the synchronizing signal BD change (if the falling edge is the valid edge, change from "H" level to "L" level). Thus, the valid edge of the synchronizing signal BD can be detected.

On the other hand, the second-stage flip-flops 324 and 324' store the levels of the synchronizing signal sampled by the first-stage flip-flops 322 and 322' at the next clock edges of the same clocks. That is, the second-stage flip-flops 324 and 324' operate as latches. Further, in each of the comparing circuits shown in FIG. 3, Q output of the second-stage flip-flop 324' (or 324) is supplied to the set terminal (negative logic) of the second-stage flip-flop 324' (or 324) of the other one of the unit detection circuit.

Assume that, among two unit detection circuits 320 and 320' that constitutes the comparing circuit, for example, the first unit detection circuit 320 supplied with φi detected the valid edge of the synchronizing signal BD earlier than the other (that is, after the valid edge of the synchronizing signal BD, φi has a clock edge earlier than φi'). In such a case, the second-stage flip-flop 324 in the first unit detection circuit 320 holds the level of the synchronizing signal BD after the valid edge, and Q output thereof becomes "L" level. And this Q output is supplied to the set terminal (negative logic) of the second-stage flip-flop 320' in the other unit detection circuit 320'. Accordingly, Q output of the second-stage flip-flop 324' in the second unit detection circuit 320' is set to "H" level. In other words, Q output of the second-stage flip-flop 324' in the second unit detection circuit 320' is initialized to a level opposite to the level of Q output of the second-stage flip-flop 324 of the first unit detection circuit 320 that detected the valid edge earlier. This situation is maintained until the level of the set terminal changes.

Note that, it is not indispensable to construct each of the unit detection circuits 320 and 320' with two flip-flops 322 and 324 (or 322' and 324'). For example, the unit detection circuit may be constructed with one flip-flop. That is, the first-stage flip-flop that samples the synchronizing signal BD may also operate as a latch to hold the sampled level of the synchronizing signal BD.

As thus explained, one of the Q outputs of the second-stage flip-flops 324 and 324' in the comparing circuit becomes "H" level and the other becomes "L" level depending on which of the pair of clocks φi and φi', which are mutually inverted, has a clock edge earlier than the other after the valid edge of the synchronizing signal BD. And these Q outputs of the flip-flops 324 and 324' are supplied to the decoder 34 as comparison results Ci and Ci' of each of the comparing circuits 32_0 to 32_3.

The decoder 34 receives comparison results Ci and Ci' from n/2 comparing circuits and determines which of the n unit detection circuits detected the valid edge of the synchronizing signal BD at the earliest timing (that is, which of the n-phase clocks has the earliest clock edge after the valid edge of the synchronizing signal BD).

Table 1 shows an exemplary determination logic of the decoder 34 where n=8. In Table 1, numbers 0 or 1 shown in the second to ninth columns from the left indicate logical values of the comparison results Ci and Ci' (i=0, 1, 2, and 3). Shown in the left-most column are results of determination representing that which of the multiphase clocks has a clock edge earliest after the valid edge of the synchronizing signal BD for each of the combinations of Ci and Ci'. And, the decoder 34 generates a 3-bit binary signal indicating the result of determination as the detect signal DET_A.

TABLE 1

| Determination result | Comparison result | | | | | | | |
|---|---|---|---|---|---|---|---|---|
| | $C_3'$ | $C_2'$ | $C_1'$ | $C_0'$ | $C_3$ | $C_2$ | $C_1$ | $C_0$ |
| $\phi_0$ | 1 | 1 | 1 | 1 | 0 | 0 | 0 | 0 |
| $\phi_1$ | 1 | 1 | 1 | 0 | 0 | 0 | 0 | 1 |
| $\phi_2$ | 1 | 1 | 0 | 0 | 0 | 0 | 1 | 1 |
| $\phi_3$ | 1 | 0 | 0 | 0 | 0 | 1 | 1 | 1 |
| $\phi_0'$ | 0 | 0 | 0 | 0 | 1 | 1 | 1 | 1 |
| $\phi_1'$ | 0 | 0 | 0 | 1 | 1 | 1 | 1 | 0 |
| $\phi_2'$ | 0 | 0 | 1 | 1 | 1 | 1 | 0 | 0 |
| $\phi_3'$ | 0 | 1 | 1 | 1 | 1 | 0 | 0 | 0 |

When the combination of Ci and Ci' is other than those shown in FIG. 1, the combination is invalid, and the decoder 34 does not generate the detect signal DET_A. After detecting the valid edge of the synchronizing signal BD, as previously explained, each of the comparing circuits 32_0 to 32_3 generates comparison results Ci and Ci' with mutually opposite levels. Accordingly, it is possible to generate the first detect signal using only one of Ci and Ci'. However, it is preferable to use both Ci and Ci' in order to prevent false detect signals from generating before the determination of the levels of Ci and Ci' of all the comparing circuits 32_0 to 32_3.

Accordingly, the decoder 34 outputs, when it is reset, a signal indicating that it is invalid. Thereafter, the decoder 34 outputs the detect signal DET_A when the combination of Ci and Ci' first becomes one of those shown in Table 1. However, when the level of the synchronizing signal BD thereafter returns to "H" and the combination of Ci and Ci' changes to one other than those shown in Table 1, it is not necessary to output a signal indicating that it is invalid. For example, it is possible to maintain the first detect signal DET_A that was previously generated until the next synchronizing signal BD is inputted and the combination of Ci and Ci' changes to one of those shown in Table 1. As a result, a specification for the minimum value of the width (the time period between the valid edge and the opposite edge) of the synchronizing signal BD may be relaxed.

As thus explained, the first timing detection circuit 30 according to this exemplary embodiment includes n unit detection circuits each supplied with each of n multiphase clocks. Each of the n unit detection circuits samples the synchronizing signal BD at clock edges of a corresponding clock to detect the valid edge. And the first timing detection circuit detects one of the clocks supplied to the unit detection circuit that detected the valid edge at the earliest timing as a clock (a closest clock) having a clock edge closest to the valid edge of the synchronizing signal BD. Accordingly, it is possible to detect the closest clock, or the clock having a clock edge closest to the valid edge of the synchronizing signal, with a simple construction.

The first timing detection circuit 30 according to this exemplary embodiment includes, according to another aspect, n/2 comparing circuits each including two unit detection circuits. Each of the unit detection circuits is provided with a latch, and, among two unit detection circuits in each of the comparing circuits, one that detected the valid edge of the synchronizing signal BD earlier than the other holds the level of the synchronizing signal after the valid edge in the latch and initializes the latch of the other one of the unit detection circuits. Accordingly, receiving from each of the comparing circuits comparison results indicating which of the latches in two unit detection circuits held the level after the valid edge, a decoder with a simple logic may determine which of n unit detection circuits detected the valid edge at the earliest timing.

Figure 4:
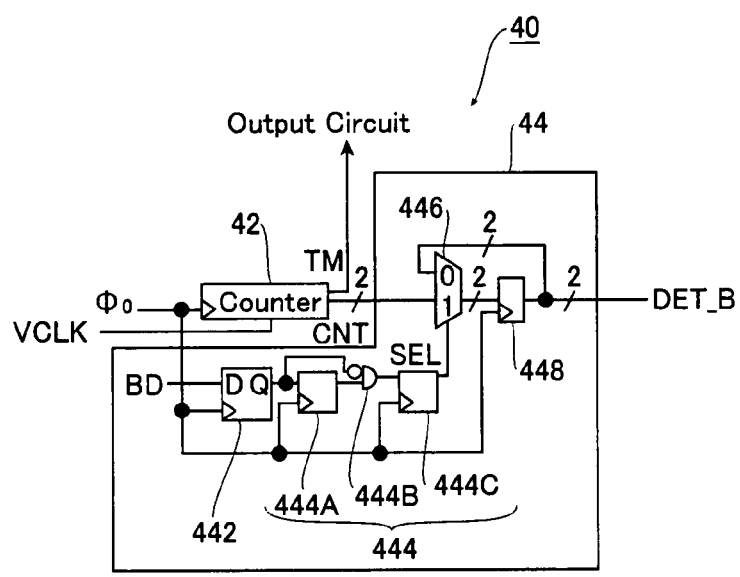
FIG. 4 is a circuit diagram showing an example of second timing detection circuit.

FIG. 4 is a circuit diagram showing an example of the second timing detection circuit 40.

In the second timing detection circuit 40 shown in FIG. 4, the counter 42 is supplied with one of the multiphase clocks (for example, $\phi_0$), as a representative clock, and is also supplied with the reference clock VCLK. And cycles of the representative clock $\phi_0$ are counted using the reference clock VCLK as a reset signal. Specifically, for example, the counter 42 is initialized at a rising edge of the reference clock VCLK and counts up synchronously with rising edges of the representative clock $\phi_0$. That is, the counter 42 generates count values COUNT (a 2-bit signal) that becomes 0 at the rising edge of the reference clock VCLK and changes as 1, 2, and 3 synchronously with rising edges of the representative clock $\phi_0$ and is again reset to 0 at the next rising edge of the reference clock VCLK.

The counter 42 further generates a timing signal TM that becomes "H" level (valid) during a period (a second period) that the counter outputs a particular count value, or specifically, 3. The timing signal TM is supplied to the output circuit 50.

The selecting circuit 44 includes a first flip-flop 442 with D input terminal thereof supplied with the synchronizing signal BD and clock terminal thereof supplied with the representative clock $\phi_0$. The flip-flop 442 operates as an edge detection circuit that samples the synchronizing signal BD at clock edges (rising edges) of the representative clock $\phi_0$ and detects the valid edge (falling edge) of the synchronizing signal.

Note that, in the first timing detection circuit 30 shown in FIG. 3, D input terminal of the first-stage flip-flop 322 in the first comparing circuit is supplied with the synchronizing signal BD and the clock terminal thereof is supplied with the representative clock $\phi_0$. Accordingly, the flip-flop 322 included in the first timing detection circuit 30 may be used commonly as the first flip-flop of the second timing detection circuit 40. In this case, as shown in FIG. 3, each of the unit detection circuits 320 and 320$\phi$ is required to be constructed with two flip-flops 322 and 324 (or 322' and 324'). If the unit detection circuit is constructed with only one flip-flop, the flip-flop within the unit detection circuit supplied with the representative clock $\phi_0$ cannot detect the valid edge of the synchronizing signal when the flip-flop is initialized before detecting the valid edge.

The selecting circuit 44 is further provided with a select signal generation circuit 444 including a second flip-flop 444A, an AND gate 444B, and a third flip-flop 444C. These second and third flip-flops 444A, 444C and the AND gate 444B generate select signal SEL, which becomes "H" level (valid) during a period (a first period) having a certain relationship with the clock edge of the representative clock $\phi_0$ by which the first flip-flop 442 detected the valid edge of the synchronizing signal BD.

Specifically, D input terminal of the second flip-flop 444A is supplied with Q output of the valid edge detection circuit (the first flip-flop) 442 and clock terminal thereof is supplied with the representative clock $\phi_0$. The AND gate 444B has a positive-logic input terminal and a negative-logic input terminal, and the positive-logic input terminal is supplied with Q output of the second flip-flop 444A and the negative-logic input terminal thereof is supplied with Q output of the first flip-flop 442. The D input terminal of the third flip-flop 444 is supplied with output of the AND gate 444B and clock terminal thereof is supplied with the representative clock $\phi_0$. Moreover, Q output terminal of the third flip-flop 444C outputs the select signal SEL.

In the example shown in FIG. 4, the select signal generation circuit 444 generates a select signal SEL that becomes, after the first flip-flop 442 detects the valid edge of the synchronizing signal BD and Q output thereof changes to "L" level, "H" level (valid) at the next rising edge of the representative clock $\phi_0$. Thereafter, the select signal SEL maintains "H" level during one cycle period of the representative clock $\phi_0$.

The selecting circuit 44 further includes a selector 446 and a fourth flip-flop 448. Two inputs of the selector 446 are supplied with the count signal CNT outputted from the counter 42 and Q output of the fourth flip-flop, respectively. The selector 446 is further supplied with the select signal SEL generated by the select signal generation circuit 444. The D input terminal of the fourth flip-flop 448 is supplied with output of the selector 446, and clock terminal thereof is supplied with the representative clock $\phi_0$. Accordingly, the count value CNT during a period (a first period) that the select signal SEL is valid is selected and is held in the fourth flip-flop 448 at the next clock edge of the representative clock $\phi_0$. And the count value CNT held in the fourth flip-flop 448 is outputted from Q output terminal of the fourth flip-flop as the second detect signal DET_B. Thereafter, this detect signal is maintained until the next select signal SEL is supplied.

As explained above, the second timing detection circuit 40 according to this exemplary embodiment includes a counter that counts cycles of the representative clock. The second timing detection circuit 40 also includes a selecting circuit 44. The selecting circuit 44 detects the valid edge by sampling the synchronizing signal BD at clock edges of the representative clock. Then, the selecting circuit 44 selects the count value during a period (first period) having a certain timing relationship with the clock edge of the representative clock by which the valid edge is detected as the second detect signal DET_B. As a result, the second detect signal may be generated with a simple construction.

Note that, the valid edge of the synchronizing signal BD is located within a cycle (a valid cycle) of the representative clock that ends at the clock edge by which the valid edge is detected. Thus, the first period also has a certain timing relationship (first timing relationship) with the valid cycle of the representative clock within which the valid edge of the synchronizing signal is located, because of the first timing relationship (second timing relationship) with the clock edge of the representative clock by which the valid edge is detected.

Note that, the second timing detection circuit 40 shown in FIG. 4 does not select a count value during the cycle, among k successive cycles of the representative clock $\phi_0$, that the valid edge of the synchronizing signal BD is positioned and outputs it as the second detect signal DET_B. It selects and outputs a count value during a cycle later than the cycle during which the valid edge of the synchronizing signal BD is positioned by delay times of the synchronizing signal detection circuit 442 and the select signal generation circuit 444. Nonetheless, the relationship between the cycle during which the valid edge of the synchronizing signal BD is positioned and the cycle during which the count value is selected is fixed. Accordingly, it is possible to know within which of k successive cycles of the representative clock $\phi_0$ the valid edge of the synchronizing signal BD is positioned using the second detect signal DET_B. That is, the second detect signal DET_B can be used as a signal that indicates within which of k successive cycles of the representative clock $\phi_0$ the valid edge of the synchronizing signal BD is positioned.

Furthermore, in the timing detection circuit 10 according to this exemplary embodiment, each of n unit detection circuits in the first timing detection circuit 30 includes a first-stage flip-flop that samples the synchronizing signal BD at clock edges of a corresponding clock and also includes, as a latch, a second-stage flip-flop that holds the level of the synchronizing signal, which was sampled by the first-stage flip-flop, at the next clock edge of the same clock. Accordingly, the first-stage flip-flop of the first timing detection circuit 30 may be commonly used in the second timing detection circuit 40 as a flip-flop to sample the synchronizing signal BD. As a result, the size of the circuit may be reduced.

Figure 5:
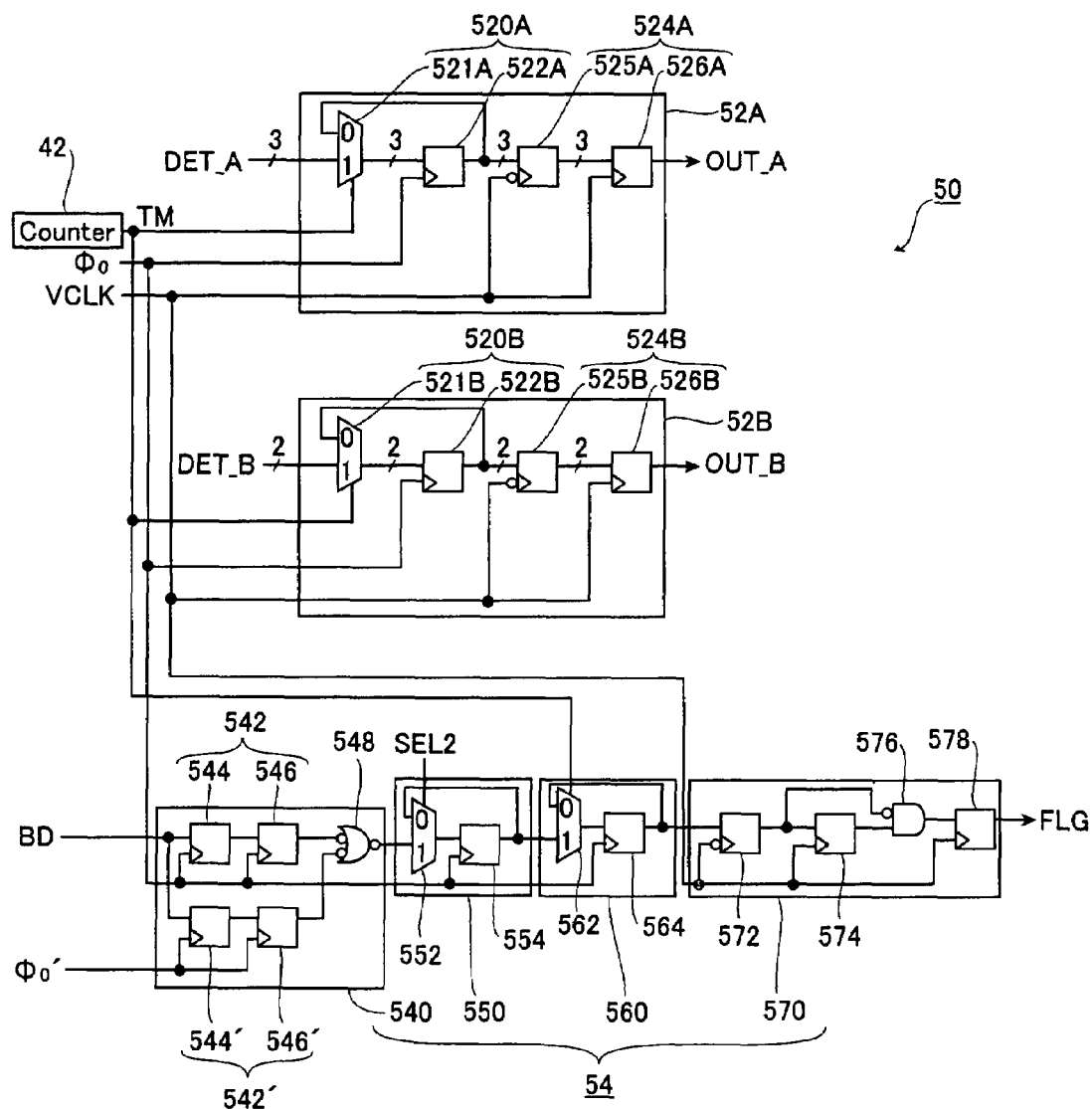
FIG. 5 is a circuit diagram showing an example of output circuit.

FIG. 5 is a circuit diagram showing an example of the output circuit 50.

The exemplary output circuit 50 shown in FIG. 5 includes a first output circuit 52A that receives and outputs the first detect signal DET_A and a second output circuit 52B that receives and outputs the second detect signal DET_B. The first output circuit 52A and the second output circuit 52B have effectively the same constructions. That is, each of them includes a capturing circuit 520A (520B) including a selector 521A (521B) and a first flip-flop 522A (522B), and a reference clock synchronizing circuit 524A (524B) including of a second flip-flop 525A (525B) and a third flip-flop 526A (526B).

The capturing circuit captures the detect signal DET_A (or DET_B) at a timing specified by the timing signal TM. In the example shown in FIG. 5, first input terminal of the selector 521A (521B) is supplied with the detect signal DET_A (DET_B), and second input terminal thereof is supplied with Q output of the first flip-flop 522A (522B), and the timing signal TM is supplied as the select signal. The D input of the first flip-flop 522A is supplied with output of the selector 521A (521B), and clock terminal thereof is supplied with the representative clock $\phi_0$.

As the timing signal TM, a signal that becomes "H" (valid) level during a period (a second period) that the count value becomes a specific value, or, for example, the maximum value (or 3, in the example shown in FIG. 5) may be supplied from, for example, the counter 42 of the second timing detection circuit 40. Accordingly, the detect signal DET_A (DET_B) during a period that the timing signal TM is valid is held by the first flip-flop 522A (522B) at the next clock edge (rising edge) of the representative clock $\phi_0$.

The reference clock synchronizing circuits generates output signals synchronized with the reference clock VCLK from the detect signals DET_A and DET_B, so that a circuit that receives the result of timing detection may easily utilize it. In the example shown in FIG. 5, Q output of the first flip-flop 522A (522B), which is the output of the capturing circuit, is supplied to D input of the second flip-flop 525A (525B), and D input terminal of the third flip-flop 526A (526B) is supplied with Q output of the second flip-flop 525A (525B). Further, clock terminals of the second flip-flop 525A (525B) and the third flip-flop 526A (526B) are supplied with the reference clock VCLK. Note that, however, the clock terminal of the second flip-flop 525A (525B) has negative logic, and the clock terminal of the third flip-flop 526A (526B) has positive logic.

As a result, the first detect signal DET_A and the second detect signal DET_B captured by the capturing circuits are outputted as the first output signal OUT_A and the second output signal OUT_B, which are synchronized with the clock edge (rising edge) of the reference clock VCLK, from Q output terminals of the third flip-flops 526A and 526B, respectively.

The exemplary output circuit 50 shown in FIG. 5 further includes a flag signal generation circuit 54.

The flag signal generation circuit 54 includes an edge detection circuit (a second edge detection circuit) 540, selecting circuit (a second selecting circuit) 550, a capturing circuit (a third capturing circuit) 560, and a reference clock synchronizing circuit (a third synchronizing circuit) 570. The edge detection circuit 540 samples the level of the synchronizing signal BD and detects the edge of the synchronizing signal. The selecting circuit 550 selects the output of the edge detection circuit 540 during a certain period and generates a detect signal (a third detect signal). The capturing circuit 560 captures the detect signal at a certain timing. The reference clock synchronization circuit 570 outputs the detect signal captured by the capturing circuit 540 as a flag signal FLG synchronized with the reference clock.

The edge detection circuit 540 includes a first unit detection circuit 542, in which two flip-flops 544 and 546 are connect in series, for sampling the synchronizing signal BD with the representative clock $\phi_0$. The edge detection circuit 540 further includes a second unit detection circuit 542', in which two flip-flops 544' and 546' are connected in series, for sampling the synchronizing signal BD with a clock $\phi_0'$, which is an inverted clock of the representative clock $\phi_0$. Outputs of the first and the second unit detection circuits are, initially (before detecting the synchronizing signal BD), "H" levels.

And, when either one of the unit detection circuits detects the valid edge (falling edge) of the synchronizing signal BD and holds the result of detection in the second-stage flip-flop, output of one of the unit detection circuit that detected the valid edge changes to "L" level.

The edge detection circuit 540 further includes a NOR gate 548 having input terminals (negative logic) supplied with outputs of the first and the second detection circuits (Q outputs of the second-stage flip-flops 546 and 546'). The output of the NOR gate 548 changes from "H" level to "L" level when either one of the outputs of the first unit detection circuit and the second unit detection circuit changes to "L" level.

Note that, the construction of the first unit detection circuit 542 and the second unit detection circuit 542' of the edge detection circuit 540 is the same as that of the first unit detection circuit 320 and the second unit detection circuit 320' of the first comparing circuit 32_0 in the first timing detection circuit shown in FIG. 3. Accordingly, the flip-flops 322, 324, 322', and 324' constituting the comparing circuit 32_0 may be commonly used as the flip-flops constituting the edge detection circuit 540.

The selecting circuit 550 includes a selector 552 and a flip-flop 554. Input terminals of the selector 552 are supplied with output of the NOR gate 548 and Q output of the flip-flop 554. The selector 552 is also supplied with second select signal SEL2. On the other hand, D input terminal of the flip-flop 554 is supplied with output of the selector 552, and clock terminal thereof is supplied with the representative clock $\phi_0$. Accordingly, the output of the NOR gate 548 during a period that the second select signal SEL2 is valid ("H" level) is selected and is held in the flip-flop 554 at the next clock edge (rising edge) of the representative clock $\phi_0$.

The second select signal SEL2 becomes "H" level (valid) during a first specific period (select period) after the edge detection circuit 540 detects the valid edge of the synchronizing signal BD and output of the NOR gate 548 becomes "L" level. Accordingly, a detect signal (third detect signal) that becomes "L" level after the edge detection circuit 540 detects the valid edge of the synchronizing signal BD may be outputted from Q output terminal of the flip-flop 554.

Specifically, the select period of the second select signal SEL2 may be, for example, the same period that the select signal SEL generated by the selecting circuit 44 shown in FIG. 4 is "H" level (valid). Accordingly, it is possible to generate a signal that becomes valid during the select period by using a circuit having the same construction as the selecting circuit 44.

The capturing circuit 560 includes a selector 562 and a flip-flop 564. Input terminals of the selector 562 are supplied with Q output of the flip-flop 554 in the selecting circuit 550 and Q output of the flip-flop 564. The selector 562 is also supplied with the timing signal TM generated by the counter 42 shown in FIG. 4. Moreover, D input terminal of the flip-flop 564 is supplied with output of the selector 562 and clock terminal thereof is supplied with the representative clock $\phi_0$. Accordingly, the detect signal (Q output of the flip-flop 554) during a period that the timing signal TM is "H" level (valid) is captured and is held in the flip-flop 564 at the next clock edge of the representative clock $\phi_0$.

The reference clock synchronizing circuit 560 includes first flip-flop 572, second flip-flop 574, AND gate 576, and third flip-flop 578. The D input terminal of the first flip-flop 572 is supplied with Q output of the flip-flop 564 in the capturing circuit 560 and clock terminal (negative logic) thereof is supplied with the reference clock VCLK. The D input terminal of the second flip-flop 574 is supplied with Q output of the first flip-flop 572 and clock terminal thereof is supplied with the reference clock VCLK. The AND gate 576 has a positive-logic input terminal and a negative-logic input terminal, and the positive-logic input terminal is supplied with Q output of the second flip-flop 574 and the negative-logic input terminal is supplied with Q output of the first flip-flop 572. The D input terminal of the third flip-flop 578 is supplied with output of the AND gate 576 and clock terminal thereof is supplied with the reference clock VCLK.

Accordingly, if Q output of the flip-flop 564 in the capturing circuit changes from "H" level to "L" level, Q output of the first flip-flop 572 changes from "H" level to "L" level at the next reverse edge (falling edge) of the reference clock VCLK. Further, a flag signal FLG, which becomes "H" level (valid) at the next clock edge of the reference clock VCLK and maintains the "H" level during one cycle period of the reference clock, is outputted from Q output of the third flip-flop 578. This flag signal FLG may be used in another circuit to set the timing to capture and utilize the first output signal OUT_A and the second output signal OUT_B.

Note that, the second select signal SEL2 also becomes "H" level (valid), in addition to the select period, in a second specific period (reset period) after the valid edge detection circuit 540 detects the reverse edge (rising edge) of the synchronizing signal BD and the output of the NOR gate 548 returns to "H" level. As a result, the level of Q output of the flip-flop 554 (third select signal) in the selecting circuit 550 returns from "L" to "H". Further, thereafter, "H" level is held in the flip-flop 564 by supplying the timing signal TM to the selector 562 of the capturing circuit 560, and each of the flip-flops in the reference clock synchronization circuit 570 returns to the initial state by supplying the reference clock VCLK to each of the flip-flops. Accordingly, it becomes possible to generate the flag signal FLG again when the valid edge of the next synchronizing signal BD is detected.

The signal that becomes "H" level during the reset period may be generated by, for example, a circuit similar to the selecting circuit 44 in which positive-input terminal and negative-input terminal of the AND circuit 444B are interchanged with each other.

Figure 6:
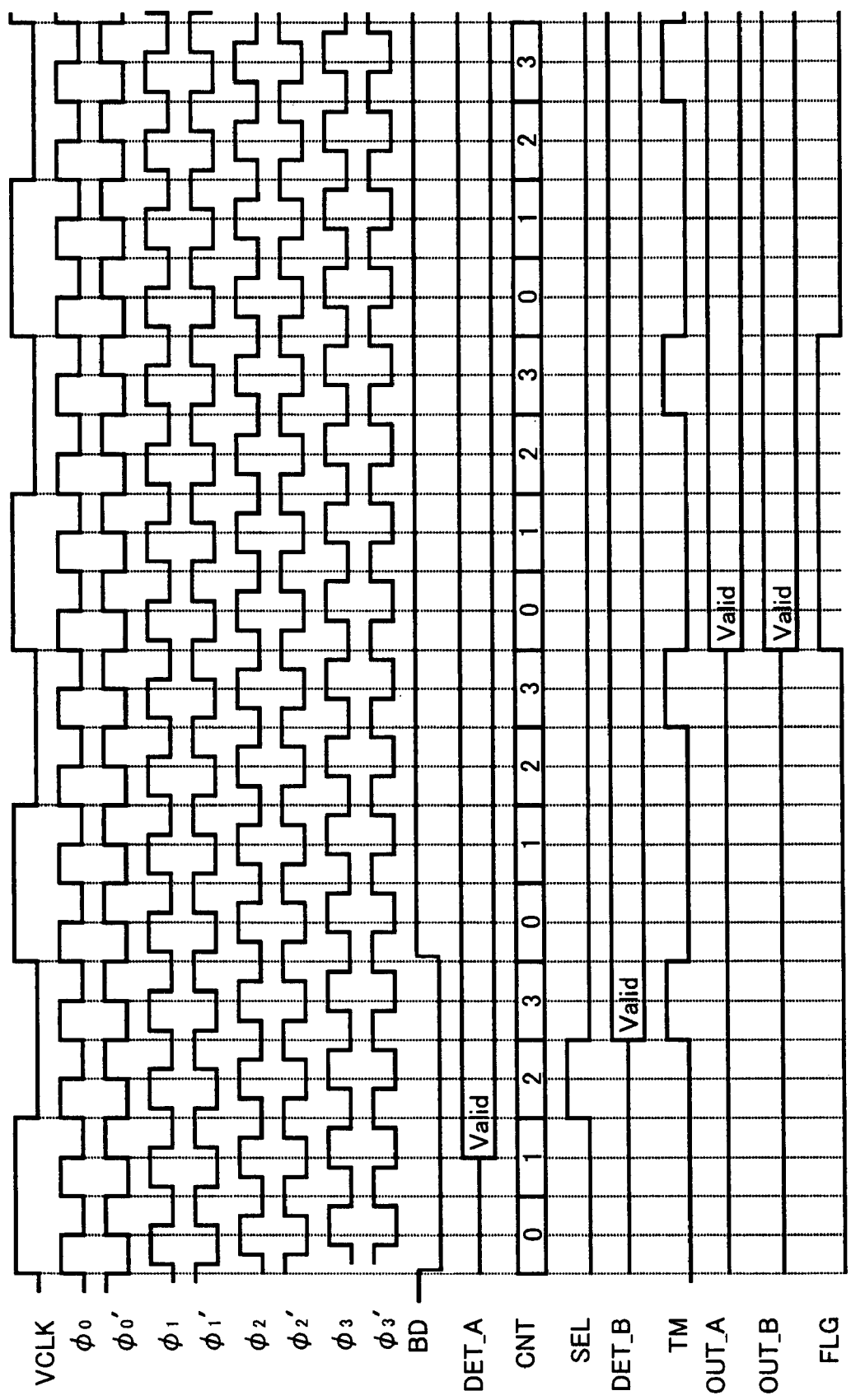
FIG. 6 is a first timing chart showing signals in respective portions of the timing detection circuit shown in FIG. 1.
Figure 7:
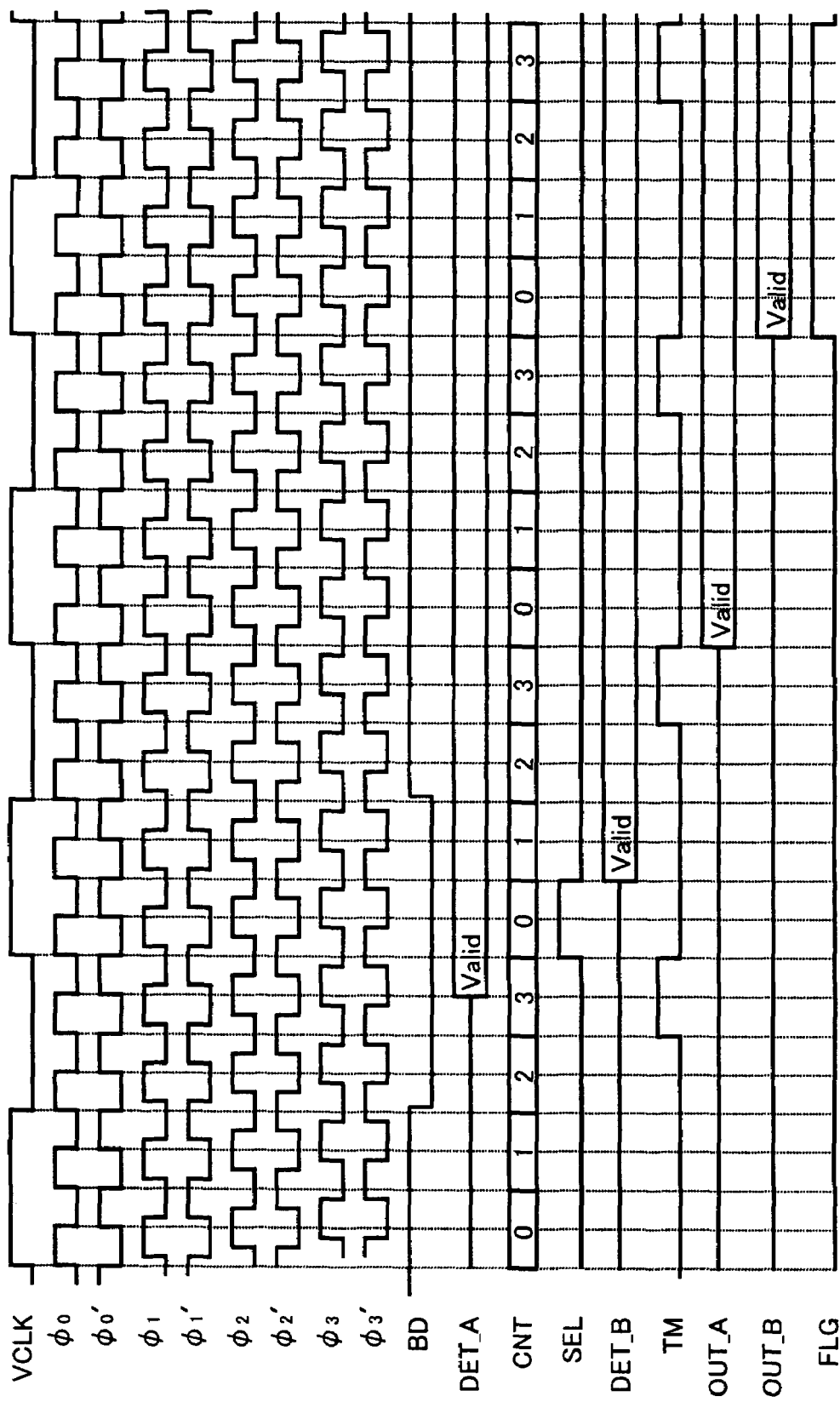
FIG. 7 is a second timing chart showing signals in respective portions of the timing detection circuit shown in FIG. 1.
Figure 8:
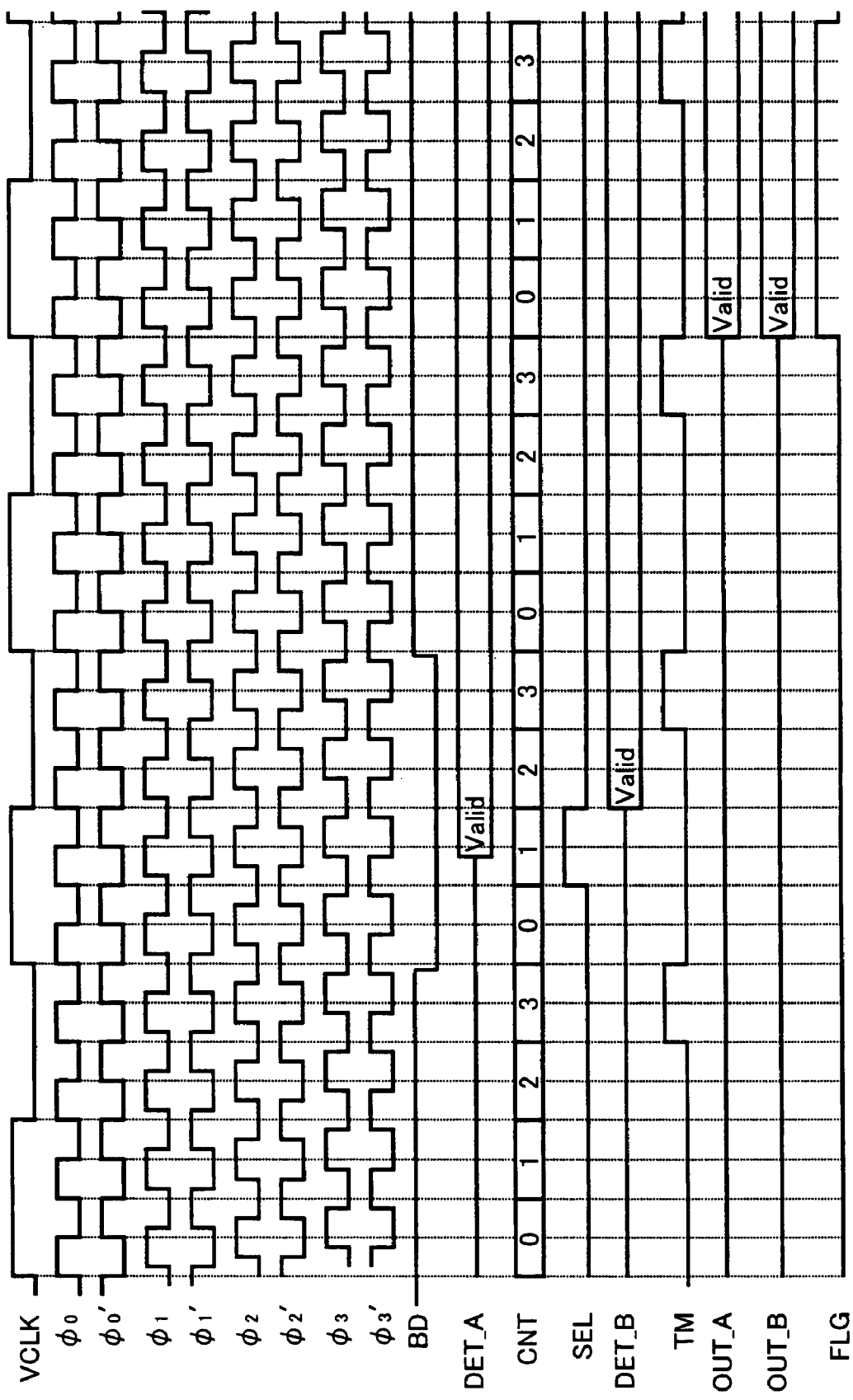
FIG. 8 is a third timing chart showing signals in respective portions of the timing detection circuit shown in FIG. 1.

FIGS. 6 to 8 are exemplary tuning charts showing signals at respective portions of the exemplary timing detection circuit 10 shown in FIG. 1.

In these exemplary timing charts, waveforms of the reference clock VCLK, multiphase clocks $\phi_0$, $\phi_0'$, $\phi_1$, $\phi_1'$, $\phi_2$, $\phi_2'$, $\phi_3$, and $\phi_3'$, synchronizing signal BD, select signal SEL, timing signal TM, and flag signal FLG are shown. The second select signal SEL2, although not shown, becomes "H" level during the same period that the select signal SEL is "H" and becomes "H" level again during a period (reset period) later than the former period by the width of the synchronizing signal BD. The count value CNT of the counter 42, which changes as 0, 1, 2, 3, 0 . . . synchronously with the edge of the representative clock $\phi_0$, is also shown in the exemplary timing charts.

For the first detect signal DET_A, the second detect signal DET_B, the first output signal OUT_A, and the second output signal OUT_B, respective timings that they become valid are shown. That is, each of the detect signals or the output signals is valid at and after the timing shown as "Valid". Specifically, at and after the timing shown as "valid", each of the first detect signal DET_A and the first output signal OUT_A is a valid signal with a specific bits (3 bits according to this exemplary embodiment) that indicates which of the multiphase clocks has a clock edge closest to the valid edge of the synchronizing signal. Each of the second detect signal DET_B and the second output signal OUT_B is a valid signal with a specific bits (2 bits according to this exemplary embodiment) that indicates within which of k successive cycles of the representative clocks the valid edge of the synchronizing signal is positioned.

Note that, each of the first and the second detect signals DET_A, DET_B, and the first and the second output signals OUT_A, and OUT_B are kept valid after it becomes valid at the timing shown in the timing chart. Then, each of the signals is replaced with an updated signal when the next synchronizing signal BD is inputted and the updated detect or output signal is generated.

FIG. 6 is a timing chart for the case that the valid edge (falling edge) of the synchronizing signal BD is positioned between a clock edge (rising edge) of $\phi_0$, which is synchronized with a rising edge of the reference clock VCLK, and a clock edge of $\phi_1$, which is next to the clock edge of $\phi_0$. FIG. 7 is a timing chart for the case that the valid edge of the synchronizing signal BD is positioned between a clock edge of $\phi_0$, which is synchronized with a falling edge of the reference clock VCLK, and a clock edge of $\phi_1$, which is next to the clock edge of $\phi_0$. FIG. 8 is a timing chart for the case that the valid edge of the synchronizing signal BD is positioned between a clock edge of $\phi_0$, which is synchronized with a rising edge of the reference clock VCLK, and a clock edge of $\phi_3'$, which precedes the clock edge of $\phi_0$.

That is, FIG. 6 shows the case that the valid edge of the synchronizing signal BD exists at the earliest position within a cycle of the reference clock VCLK, FIG. 8 shows the case that the valid edge exists at the latest position within the cycle, and FIG. 7 shows the case between them.

Note that, in each of the cases shown in FIGS. 6 to 8, the synchronizing signal BD has a width (a period from the falling edge to the rising edge) equal to one cycle of the reference clock VCLK. The timing detection circuit 10 according to this exemplary embodiment is able to detect, wherever the valid edge of the synchronizing signal is positioned, the timing of the valid edge, if the width of the synchronizing signal is equal to or longer than a cycle of the reference clock VCLK.

In the case shown in FIG. 6, among 8 unit detection circuits included in the first timing detection circuit 30 shown in FIG. 3, one that is supplied with clock $\phi_1$ detects the valid edge of the synchronizing signal BD first. Thereafter, unit detection circuits supplied with $\phi_2$, $\phi_3$, and $\phi_0'$ detect the valid edge of the synchronizing signal in that order. Further, comparison results Ci and Ci' of four comparing circuits 32_0 to 32_3 in the first timing detection circuit are settled at the next clock edge (rising edge) of $\phi_0'$, and the decoder 34 outputs the first detect signal DET_A. That is, the first detect signal DET_A becomes valid at the timing of the second rising edge of $\phi_0'$ from the left on the drawing.

This first detect signal DET_A is captured, after it becomes valid, by the capturing circuit of the first output circuit 52A shown in FIG. 5 during a period that the timing signal TM first becomes "H" (valid) level. Or, more exactly, the capturing circuit captures the first detect signal DET_A at the timing of the last rising edge of the representative clock $\phi_0$ during the period that the timing signal TM is valid. Thereafter, the captured first detect signal is outputted as the first output signal OUT_A synchronized with the next rising edge of the reference clock VCLK. That is, the first output signal OUT_A becomes valid at the timing of the third rising edge of the reference clock VCLK from the left on the drawing.

On the other hand, the selection circuit 44 in the second timing detection circuit 40 shown in FIG. 4 detects the valid edge of the synchronizing signal BD at the second rising edge of the representative clock $\phi_0$ from the left on FIG. 6. Further, the selection circuit 44 generates a select signal SEL, which is "H" level (valid) for a period of one clock cycle from the next rising edge of the representative clock $\phi_0$. The count value CNT during the period that the select signal SEL is valid is selected, and the second detect signal DET_B is generated at the next clock edge of the representative clock $\phi_0$. That is, the second detect signal DET_B becomes valid at the timing of the fourth rising edge of the representative clock $\phi_0$ from the left on FIG. 6.

The second detect signal DET_B is captured, after it becomes valid, by the capturing circuit of the second output circuit 52B shown in FIG. 5 during a period that the timing signal TM first becomes valid. Or, more exactly, the capturing circuit captures the second detect signal DET_B at the timing of the last rising edge of the representative clock $\phi_0$ during the period that the timing signal TM is valid. Then, the captured second detect signal is outputted as the second output signal OUT_B in synchronous with the next rising edge of the reference clock signal VCLK. That is, the second output signal OUT_B becomes valid at the timing of the third rising edge of the reference clock VCLK from the left on FIG. 6.

Similarly, the flag signal generation circuit 54 shown in FIG. 5 detects the valid edge of the synchronizing signal BD at the first rising edge of $\phi_0'$, which is the opposite phase clock of the representative clock $\phi_0$. This result of detection is held by the second-stage flip-flop 546' at the next rising edge of $\phi_0'$, and output of the NOR gate 548 changes to "L" level. Further, during a period that the select signal SEL is "H" level, the second select signal SEL2 also becomes "H" level (valid) and, thus, output of the NOR gate 548 is selected and the third detect signal (not shown in FIG. 6) is generated. The third detect signal is captured during a period (a second period) that the timing signal TM is "H" level and a flag signal FLG which becomes "H" level (valid) for a period of one cycle of the representative clock VCLK from the same timing that the second output signal OUT_B becomes valid, is outputted.

As explained above, the first detect signal DET_A and the second detect signal DET_B become valid at mutually different timings. Moreover, the timing that each of them becomes valid does not coincide with an edge of the reference clock VCLK. However, the exemplary output circuit 50 according to this embodiment includes first and second capturing circuits that capture the first detect signal DET_A and the second detect signal DET_B during a period (a second period) that the counter in the second timing detection circuit 40 outputs a specific count value. The exemplary output circuit 50 further includes first and second reference clock synchronizing circuits that synchronizes the first and the second detect signals, which are captured by the first and the second capturing circuits, with the reference clock VCLK and outputs them as a first output signal OUT_A and a second output signal OUT_B. As a result, regardless of the timings that the first detect signal and the second detect signal become valid, it is possible to output the first output signal OUT_A and the second output signal OUT_B in synchronous with the reference clock VCLK. Accordingly, another circuit that receives the first and the second output signals OUT_A and OUT_B may easily utilize them.

Moreover, the exemplary output circuit 50 according to this embodiment further includes a valid edge detection circuit that detects a valid edge of the synchronizing signal BD and generates a third detect signal. The exemplary output circuit 50 further includes a third capturing circuit that captures the third detect signal during a second period, and a third reference clock synchronizing circuit that outputs the third detect signal captured by the third capturing circuit as a flag signal FLG in synchronous with the reference clock. Accordingly, in addition to the first output signal OUT_A and the second output signal OUT_B, it is also possible to output the flag signal FLG in synchronous with the reference clock signal VCLK. It makes further easier for another circuit to utilize the first and the second output signals by using the flag signal.

In the example shown in FIG. 6, the first output signal OUT_A and the second output signal OUT_B become valid at a timing of the same clock edge (rising edge) of the reference clock VCLK. Moreover, the flag signal FLG becomes "H" level (valid) simultaneously with the timing that the first output signal OUT_A and the second output signal OUT_B become valid.

The cases of FIGS. 7 and 8 are basically the same as the case of FIG. 6, although detailed explanations are omitted. That is, the first detect signal DET_A and the second detect signal become valid at mutually different timings, and the timings that they become valid are not coincide with an edge of the reference clock VCLK. However, both the first output signal OUT_A and the second output signal OUT_B are outputted in synchronous with the reference clock VCLK. Moreover, the flag signal FLG also becomes valid in synchronous with the reference clock VCLK.

Comparing FIGS. 6, 7, and 8 enables to understand that the timings when the first detect signal DET_A and the second detect signal DET_B become valid change as the timing of the valid edge of the synchronizing signal BD changes. However, regardless of the change of the timings when the detect signals become valid, the first output signal OUT_A and the second output signal OUT_B become valid in synchronous with the reference clock signal VCLK. Moreover, the flag signal FLG also become valid in synchronous with the reference clock VCLK.

Note that, however, the timings that the output signals OUT_A, OUT_B, and the flag signal FLG become valid change as the timing of the valid edge of the synchronizing signal BD changes. That is, the timing moves by the unit of one cycle of the reference clock VCLK. Specifically, in the case of FIG. 7, the timing that the first output signal OUT_A becomes valid is the same as the case of FIG. 6. On the other hand, the timing that the second output signal OUT_B and the flag signal FLG become valid is later than that of the case of FIG. 6 by one cycle of the reference clock VCLK. Furthermore, in the case of FIG. 8, the timing that the first output signal OUT_A becomes valid is also later that that of the case of FIG. 6 by one cycle of the reference clock VCLK.

Here, in the case of FIG. 7, the timing that the first output signal OUT_A becomes valid and the timing that the second output signal OUT_B becomes valid are different. Nevertheless, this is permissible.

In the exemplary output circuit 50 of the timing detection circuit 10 according to this exemplary embodiment, both the first output signal OUT_A and the second output signal OUT_B maintain their values after they become valid, until the next synchronizing signal BD is inputted and updated first or second output signal is generated. Thus, even if the timing that first output signal OUT_A becomes valid and the timing that the second output signal OUT_B becomes valid are different, it is possible to capture these output signals and utilize them after both of them become valid.

In any of the cases of FIGS. 6 to 8 or, although not illustrated, in any of the cases that the valid edges of the synchronizing signal BD are positioned at any timings between those of the cases of FIG. 6 and FIG. 8, the maximum difference between the timing that the first output signal OUT_A becomes valid and the timing that the second output signal OUT_B becomes valid is one cycle period of the reference signal VCLK. Further, when the timings are different, the timing that the second output signal OUT_B becomes valid is always later than the other. Thus, it is possible to utilize both the first output signal OUT_A and the second output signal OUT_B by waiting until the second output signal OUT_B becomes valid.

Moreover, in any of the cases of FIGS. 6 to 8, or in any of the cases that the valid edges of the synchronizing signal BD are positioned at any timings between those of the cases of FIG. 6 and FIG. 8, the flag signal FLG becomes valid at the same timing that the second output signal OUT_B becomes valid. That is, during the period that the flag signal FLG is valid ("H" level), both the first output signal OUT_A and the second output signal OUT_B are always valid. Accordingly, regardless of the timing of the valid edge of the synchronizing signal BD, the flag signal FLG may be used as a signal to indicate the timing that both the first output signal OUT_A and the second output signal OUT_B are valid and usable.

Note that, it is not necessary that the timing that the flag signal FLG becomes valid coincide with the timing that the second output signal OUT_B becomes valid or with the timing that both the first and the second output signals become valid. The flag signal may be used in another circuit as a signal to indicate the timing to capture the first and the second output signal, if the relationship between the timing that the flag signal becomes valid and the timing that both the first output signal OUT_A and the second output signal OUT_B become valid and usable is constant.

Thus far, exemplary embodiments of this invention have been explained in detail. Needless to say, however, this invention is not limited to the specific examples explained above, and may accept various modifications and improvements.

For example, in the exemplary first timing detection circuit shown in FIG. 3, pair of clocks $\phi i$ and $\phi i'$, which are mutually inverted, are supplied to two unit comparing circuits included in each of the comparing circuits 32_0 to 32_3. As a result, the difference in the timings of two clocks supplied to the comparing circuit is made large and a stable operation of the comparing circuit is easily accomplished. However, the first timing detection circuit according to this invention is not limited to this embodiment, but any two of the clocks may be paired and be supplied to each of the comparing circuits.

In the exemplary flag signal FLG generation circuit 54 shown in FIG. 5, the representative clock $\phi_0$ and its inverted clock $\phi_0'$ are used for sampling the synchronizing signal BD in the edge detection circuit 540. However, this is not indispensable for this invention, but other clocks may be used. Even in a case that other clocks are used, the timing of the select period during which the second select signal SEL2 becomes valid may be adjusted, as required, so that the selecting circuit 550 selects output of the NOR gate 548 after the edge detection circuit 540 detected the valid edge of the synchronizing signal BD and the output of the NOR gate 548 becomes "L" level.

Moreover, the flag signal FLG generation circuit 54 shown in FIG. 5 generates a flag signal FLG that becomes "H" level and valid during a period of one cycle of the reference clock VCLK. However, the period that the flag signal FLG becomes valid need not to be one cycle, but may be a plurality of cycles as long as being synchronized with the reference clock VCLK. Further, it is also possible to generate a flag signal FLG that becomes valid when it is "L" level.

What is claimed is:

1. A timing detection circuit for detecting a timing of a valid edge of a synchronizing signal with respect to a reference clock having a reference frequency, the timing detection circuit comprising:

a multiphase clock generation circuit that generates n (n is an integer equal to or larger than two) multiphase clocks having respective clock edges and further having a frequency of k (k is an integer equal to or larger than two) times the reference frequency and mutually difference phases;

a first detection circuit that detects, among the multiphase clocks, a closest clock having the clock edge closest to the valid edge of the synchronizing signal and generates a first detect signal indicating the closest clock; and a second detection circuit that detects, among k successive cycles of a representative clock selected from the multiphase clocks, a valid cycle within which the valid edge of the synchronizing signal is located and generates a second detect signal indicating the valid cycle;

wherein the second timing detection circuit includes a counter that counts cycles of the representative clock to generate count values and a selecting circuit that selects one of the count values during a first period having a first timing relationship with the valid cycle to generate the second detect signal.

2. The timing detection circuit according to claim 1, wherein the counter counts the cycles of the representative clock using the reference clock as a reset signal.

3. The timing detection circuit according to claim 1, wherein the selecting circuit in the second timing detection circuit samples the synchronizing signal at the clock edges of the representative clock and detects the valid edge of the synchronizing signal, the selecting circuit selects one of the count values during a period having a second timing relationship with the clock edge, by which the valid edge is detected, of the representative clock so that one of the count values during the first period is selected.

4. The timing detection circuit according to claim 1, wherein:

the first detection circuit includes n flip-flops each samples the synchronizing signal at the clock edges of corresponding one of the multiphase clocks supplied thereto and detects the valid edge of the synchronizing signal; and the selecting circuit of the second timing detection circuit detects the valid edge of the synchronizing signal using one of the flip-flops in the first detection circuit, the selecting circuit selects one of the count values during a period having a second timing relationship with the clock edge, by which the valid edge is detected, of one of the multiphase clocks supplied to the one of the flip-flops so that one of the count values during the first period is selected.

5. The timing detection circuit according to claim 1, wherein the multiphase clock generation circuit receives the reference clock and generates the multiphase clocks from the reference clock.

6. The timing detection circuit according to claim 1, further comprising an output circuit that receives the first detect signal and the second detect signal and outputs a first output signal indicating the closest clock and a second output signal indicating the valid cycle, wherein the output circuit includes a capturing circuit that captures the first detect signal and the second detect signal during a second period that the counter generates a specific count value.

7. The timing detection circuit according to claim 1, wherein n is an even number and the first detection circuit includes:

n unit detection circuits each including a latch, each of the unit detection circuits samples the synchronizing signal at the clock edges of corresponding one of the multiphase clocks supplied thereto and detects the valid edge of the synchronizing signal;

n/2 comparing circuits each including two of the unit detection circuits, one of the unit detection circuits in each of the comparing circuits that detected the valid edge earlier than the other holds a level of the synchronizing signal after the valid edge in the latch and initializes the latch in the other one of the unit detection circuits, each of the comparing circuits outputs a comparison result indicating which of the latches held the level of the synchronizing signal after the valid edge; and a decoder that receives the comparison results from the comparing circuits and determines which of the unit detection circuits detected the valid edge at an earliest timing so that one of the multiphase clocks supplied to the unit detection circuit that detected the valid edge at the earliest timing is detected as the closest clock.

8. The timing detection circuit according to claim 7, wherein corresponding ones of the multiphase clocks supplied to two unit detection circuits in each of the comparing circuits are mutually inverted.

9. The timing detection circuit according to claim 7, wherein the multiphase clock generation circuit receives the reference clock and generates the multiphase clocks from the reference clock.

10. The timing detection circuit according to claim 7, further comprising an output circuit that receives the first detect signal and the second detect signal and outputs a first output signal indicating the closest clock and a second output signal indicating the valid cycle in synchronous with the reference clock.

11. The timing detection circuit according to claim 4, wherein the counter counts the cycles of the representative clock using the reference clock as a reset signal.

12. The timing detection circuit according to claim 4, wherein the multiphase clock generation circuit receives the reference clock and generates the multiphase clocks from the reference clock.

* * * * *